UNITED STATES PATENT OFFICE.

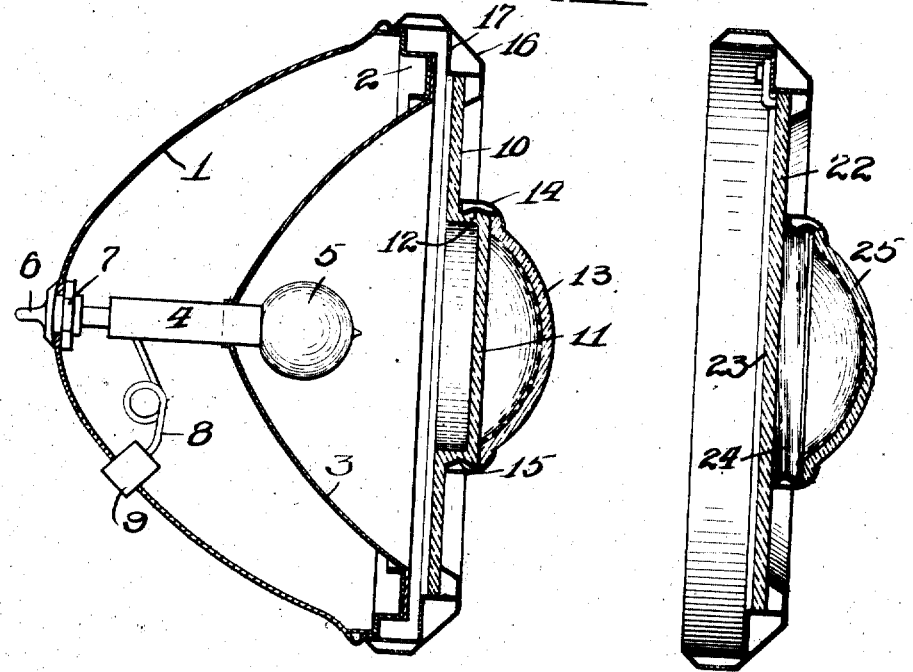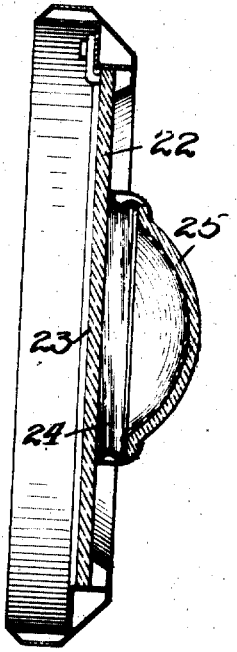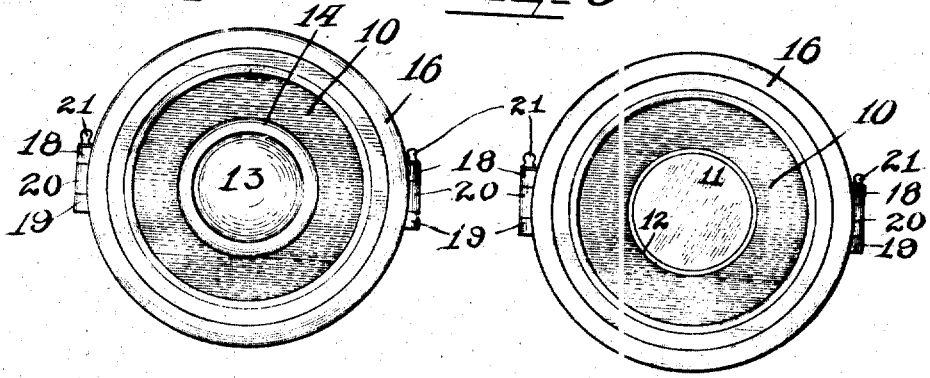

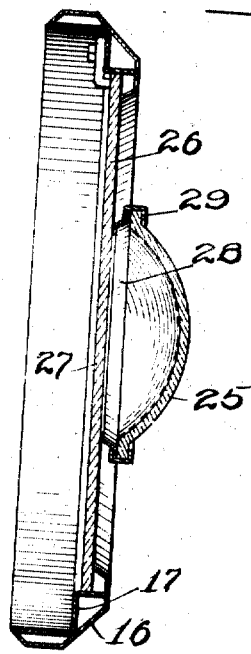
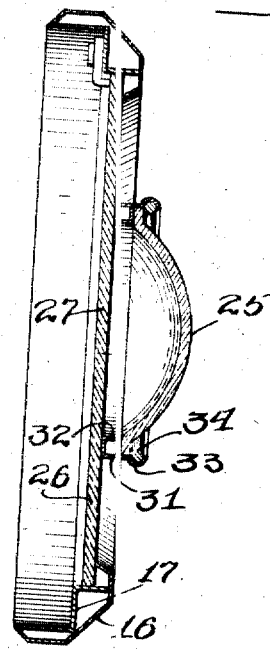
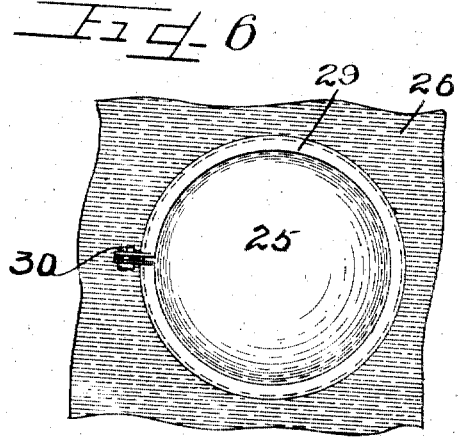
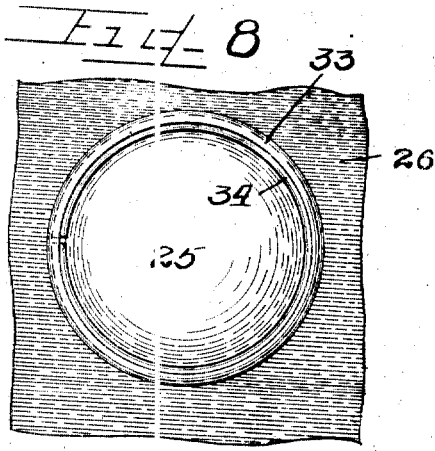

WARD S. PERRY, OF CHICAGO, ILLINOIS.

HEADLIGHT.

1,219,480.  Specification of Letters Patent.  Patented Mar. 20, 1917.

Application filed November 30, 1914. Serial No. 874,623.

*To all whom it may concern:*

Be it known that I, WARD S. PERRY, a citizen of the United States, and a resident of the city of Chicago, in the county of Cook and State of Illinois, have invented certain new and useful Improvements in Headlights; and I do hereby declare that the following is a full, clear, and exact description of the same, reference being had to the accompanying drawings, and to the numerals of reference marked thereon, which form a part of this specification.

The glaring headlights used on motor cars have proved to be a source of considerable danger to drivers of other vehicles or motor cars approaching from an opposite direction, owing to the fact that the intense beam of light from the headlights momentarily blinds the operator of the approaching vehicle. In a great many cities ordinances have been passed prohibiting the use of glaring headlights and consequently it has become necessary to provide a headlight which can be dimmed for use in cities where such ordinances require and yet may, by slight adjustment, be made suitable for use upon the open road in the country or suburbs. Accordingly this invention relates to a means of attachment upon a headlight which acts to soften and diffuse the light therefrom, distributing the same over a wide area for use in cities or other properly lighted places, and yet by detachment of said means said headlight becoming instantly useful for throwing a far-reaching and bright beam of light directly ahead upon the road in unfrequented or poorly lighted thoroughfares. The device not only permits the owner or operator of a motor car upon which such headlight is mounted to comply with the regulations governing the use of the same, but also adds greatly to the ornamental appearance of the light.

It is an object therefore of this invention to construct a headlight provided with means for attachment or detachment therefrom acting when attached to diffuse and distribute the light over a wide area entirely without a glaring effect.

It is also an object of this invention to construct a headlight provided with a glass or lens a part of which is clear, and a part of which is frosted, and with removable means attachable over the clear portion acting to diffuse the intense rays of light which would otherwise be emitted therethrough.

It is also an important object of this invention to construct a headlight the glass or lens of which is provided with a frosted annulus leaving a central aperture of clear glass over which a frosted auxiliary or secondary lens may be attached, acting when so attached together with said frosted annulus to diffuse the light over a wide area, and when removed permitting an intense beam of light to be thrown directly ahead.

It is furthermore an important object of this invention to construct a headlight provided with a flat main lens and a dome-shaped auxiliary lens attachable thereon, the latter when attached acting, together with said main lens, to diffuse the light over a wide area entirely without glaring effects and when removed permitting an intense beam or ray to be thrown directly ahead, said auxiliary lens being curved or dome shaped.

It is finally an important object of this invention to construct a headlight which, for use in cities or other places prohibiting the use of glaring lamps, may by simple attachment of an auxiliary lens act to diffuse the rays of light over a wide area, and yet readily detachable from the main lens when a strong and far reaching ray of light is desired.

The invention (in the preferred form) is illustrated in the drawings and hereinafter more fully described.

In the drawings:

Figure 1 is a central vertical section taken through a headlight embodying the principles of my invention with parts shown in elevation.

Fig. 2 is a front view thereof.

Fig. 3 is a view similar to Fig. 2, but with the secondary or auxiliary lens detached.

Fig. 4 is a fragmentary view illustrating another method of attaching the secondary lens upon the main lens of the headlight.

Fig. 5 is a view similar to Fig. 4, illustrating another modification.

Fig. 6 is a fragmentary base view illustrating the means of attaching the auxiliary lens shown in Fig. 5.

Fig. 7 is a view similar to Fig. 5, of another modified form of device.

Fig. 8 is a fragmentary face view thereof.

As shown on the drawings:

The outer metal casing of the lamp is indicated by the reference numeral 1, and as usual is constructed of sheet metal formed conveniently to a parabolic shape, and having fitted within its edge a ring 2, which may be expanded thereinto or soldered as desired to afford a rigid connection. A parabolic reflector 3, is secured along its outer flat margin upon said ring 2, and is provided with a central aperture through which a receptacle 4, for any conventional bulb 5, extends. Said receptacle is held in position by means of an outer thumb nut 6, and an inner nut 7, which are engaged upon the stem of said receptacle and act to clamp the same securely upon said outer casing 1. Wires for the bulb are inclosed in a lead 8, which is connected to a connection 9, secured in an aperture in the lower wall of the casing 1. The form of the glass or lens used in the headlight shown in Figs. 1, 2, and 3, embraces a circular piece of glass having a frosted annulus portion 10, and offset outwardly and centrally therefrom is a circular clear portion of glass 11, the outer periphery of which has threads cast or formed therein as indicated by the reference numeral 12. A curved or dome shaped circular cap of glass 13, which may be frosted, colored, or opaque, as desired, or which of course may be of other material than glass, is secured within an ornamental metal ring 14, by means of an inner threaded ring 15, which is soldered to said outer ring 14, and is adapted to be threaded upon said threads 12, of the offset portion of the main glass, thus maintaining said cap 13, in position.

The main lens of the headlight is held in position within an outer ornamental metal ring 16, and an inner ring 17, of Z-section, which is soldered therein or otherwise secured thereto, said assembled rings 16 and 17, being attached to the main casing 1, of the lamp on each side thereof. For this purpose a pair of lugs 18 and 19, are riveted or brazed upon the exterior of said casing 1, one pair on each side thereof, and complemental lugs 20, are mounted on said ornamental ring 16, adapted to interfit between said respective lugs 18 and 19. All of said lugs are apertured to receive pintle bolts 21, therethrough which hold the same engaged with one another, thus maintaining the main glass or lens held rigidly disposed over the front of the lamp.

In the modification illustrated in Fig. 4, I have shown the attaching rings 16 and 17, similar to those already described, but in the present instance the main light of glass consists of a single flat member having, however, an annulus 22, of frosted glass, and a circular clear portion 23. Cemented or affixed in any desired manner upon said main light of glass surrounding the clear portion 23, thereof, is a threaded ring 24, preferably of metal, and a dome shaped glass cap 25, similar to the cap 13, already described, is adapted to be detachably secured over said clear glass portion 23, upon said ring 24, in a manner already described.

In Figs. 5 and 6, I have illustrated another modification wherein the main light of glass which consists of a frosted annulus 26, and a clear central portion 27, has cemented thereon a metallic ring 28. A dome shaped glass cap, either frosted or colored as desired, is attached thereon by means of a split ring 29, which is provided with flanged or lug portions engaged by an adjustable bolt 30, for contracting the ring, thus holding said glass cap clamped upon the attaching ring 28.

In Figs. 7 and 8, I have illustrated another arrangement for attaching the cap 25, upon the main glass, and for this purpose one edge of a unitary metallic ring 31, is folded inwardly as indicated by the reference numeral 32, to afford a flat surface whereby the ring may be cemented upon the main glass, and a grooved outer portion 33, is provided, into which a split ring 34, may be sprung over the flange of the cap 25, said split ring of course removable to permit detachment of the cap.

When the headlight is used in cities or in other places where a non-glaring light is required, the dome shaped glass is attached upon the main light of glass or lamp of the headlight, it being a simple matter to attach and detach the glass upon the headlight in any of the constructions shown. Of course it is perfectly obvious that the cap may be also hingedly connected either directly to the attaching means upon the main light of glass or to the outer rings 16 and 17, if so desired, so that said cap may then be thrown back into an open position.

The light has been found to be peculiarly efficient for use in the country and other open places where a strong bright light is required for the reason that with the small secondary cap removed, a beam or ray of light is thrown far ahead, and the frosted annulus of the main glass acts to distribute other of the rays of the light over a wide area directly in front of the vehicle.

It is obvious that this invention is susceptible of wide variation without departing from the principles thereof, and I therefore do not purpose limiting the patent granted otherwise than necessitated by the prior art.

I claim as my invention:

1. In a headlight of the class described a lens having transparent and semi-transparent portions, attaching means rigidly secured on said lens between said transparent and semi-transparent portions, and a semi-transparent glass cap adapted to be secured to said means to cover said transparent portion.

2. In a device of the class described, a casing; a reflector therein, an incandescent bulb mounted within said reflector; a main light of glass secured on said casing over said reflector, said glass having a clear outwardly directed raised portion and a translucent flat portion, and a secondary glass member adapted to be secured on said clear raised portion to completely cover the same.

3. In a device of the class described the combination with a headlight of a glass thereon having a semi-transparent annulus portion, a raised portion of clear glass within said annulus and integrally formed on said glass, and a cap adapted to be secured on said raised portion of clear glass.

4. In a device of the class described the combination with a headlight, of a light of glass secured thereon, said light of glass having a semi-transparent annulus portion and a central circular clear portion of glass, attaching means on said glass between said semi-transparent and clear portions, and a semi-transparent cap adapted to be secured on said means to cover said clear portion of glass.

5. The combination with a headlight, of a light of glass secured thereon embracing a semi-transparent annulus portion, and an integral raised portion of clear glass, threads formed around the outer periphery of said raised portion, and a semi-transparent cap adapted to be secured thereover by engagement with said threads.

In witness whereof I have hereunto subscribed my name in the presence of two subscribing witnesses.

WARD S. PERRY.

Witnesses:
CHARLES W. HILLS, Jr.,
FRANK K. HUDSON.